US010624264B1

(12) United States Patent
Seliga

(10) Patent No.: US 10,624,264 B1
(45) Date of Patent: Apr. 21, 2020

(54) MOUNTING PLATE AND CAGE FOR ATTACHING DEBRIS BLOWER TO RIDING MOWER

(71) Applicant: James Seliga, Bellevue, OH (US)

(72) Inventor: James Seliga, Bellevue, OH (US)

( * ) Notice: Subject to any disclaimer, the term of this patent is extended or adjusted under 35 U.S.C. 154(b) by 274 days.

(21) Appl. No.: 15/498,771

(22) Filed: Apr. 27, 2017

Related U.S. Application Data

(63) Continuation-in-part of application No. 62/328,695, filed on Apr. 28, 2016.

(51) Int. Cl.
| | | |
|---|---|---|
| *A01K 1/01* | (2006.01) | |
| *A01D 42/06* | (2006.01) | |
| *A01D 101/00* | (2006.01) | |
| *A01K 31/18* | (2006.01) | |
| *A01K 31/04* | (2006.01) | |

(52) U.S. Cl.
CPC .......... *A01D 42/06* (2013.01); *A01D 2101/00* (2013.01); *A01K 1/01* (2013.01); *A01K 31/04* (2013.01); *A01K 31/18* (2013.01)

(58) Field of Classification Search
CPC .................................. A01K 1/01; A01K 31/04
See application file for complete search history.

(56) References Cited

U.S. PATENT DOCUMENTS

| | | | |
|---|---|---|---|
| 4,078,365 A | 3/1978 | Ingalls | |
| 5,056,180 A | 10/1991 | Stanton | |
| 5,119,619 A * | 6/1992 | Zappia | A47L 11/40 56/12.8 |
| 5,542,243 A | 8/1996 | Yuki | |
| 6,009,595 A | 1/2000 | Leasure | |
| 7,240,891 B2 * | 7/2007 | Hafendorfer | |
| 7,603,738 B1 | 10/2009 | Woodcock | |
| 8,387,205 B2 | 3/2013 | Weihl | |
| 9,949,462 B2 * | 4/2018 | Zimmerman | |
| 2014/0157744 A1 * | 6/2014 | Anderson | |

* cited by examiner

*Primary Examiner* — Michael D Jennings
(74) *Attorney, Agent, or Firm* — Jerry Semer

(57) ABSTRACT

The invention consists of a mounting plate and a cage. The mounting plate is mounted on the back of a riding mower. The mounting plate is made out of a flat piece of metal with the edges turned at right angle. The edges have openings and slots. Openings on the flat portion attach the mounting plate to the riding mower with bolts. A blower is placed in the cage. The cage is made out of four metal tubes and a platform. An attaching plate attaches the metal tubes and the platform to the mounting plate. The attaching plates have a set of opening and pins. The cage is attached to mounting plate by placing pins on the attaching plate within the slots on the mounting plate. A clovis pins is placed through openings on mounting plate and the attaching plate to hold cage on the mounting plate.

19 Claims, 7 Drawing Sheets

MOUNTING PLATE AND CAGE FOR ATTACHING DEBRIS BLOWER TO RIDING MOWER

FIELD OF THE INVENTION

The invention relates to the field of mounting plate and cages to attach debris blowers to riding mowers and more particularly to the field of debris blowers' mounting plate and cages that allow the debris blowers to be mounted and adjusted between several heights.

BACKGROUND OF THE INVENTION

Commercial businesses, residents, golf courses and other businesses need mowers to mow their lawns. If the lawn is sufficiently large they have riding mowers. Also, these same commercial businesses, residents, golf and other businesses need blowers to blow debris, grass, and leaves from their lawns, driveways, and parking lots. If the lawns, driveways and parking are sufficiently large companies and individuals would want some type riding blower. The inventor has developed a cage and mounting plate to place the blower on the back of the riding mower so that there is no necessity to purchase two different riding devices.

Blowers used for moving debris, grass, and leaves are usually centrifuge blowers. These blowers usually contain a circular housing that contains the spinning vanes. Tangentially extending from the circular housing is the output port through which the air is blown. The air is taken into the blower by openings surrounding the center of the blower. An engine is attached to the vanes within the housing to spin the vanes.

Blowers of this type are mounted to small tractors and are used to remove debris and leaves from driveways, parking lots and lawns. Blower of this type has also been attached to wheeled carts. These wheeled cart are usually pushed around by individuals. However, as stated before this is tedious work. Thus, individuals in the prior art have attached the carts to riding mowers through some type of hitch. Since these carts are wheeled they are heavy and hard to control. They are also subject to increased maintenance. The inventor has created a cage that can hold a similar type blower. The cage can be mounted on the back of a riding mower by the inventors mounting plate and two clevis pins. The inventors mounting plate is designed such that the cage can be moved to different heights. The advantage of enabling the blower to be moved to different heights is that the heights can be adjusted for types of terrain. Also, it enables the riding lawnmower and the mounted cage to be loaded onto a trailer without removing the mounting cage.

SUMMARY OF THE INVENTION

The invention consists of two parts. The first part is a cage in which the blower is placed. The second part is a mounting plate that is mounted on the back of a riding mower. In the preferred embodiment, the riding mower is a zero turn riding mower. The mounting plate is made out of a flat piece of metal with the edges turned at a right angle. The edges at the top has openings and at the bottom angled slots that angle downward. On the flat portion of the mounting plate there is a set of openings. This set of openings are used to attach the mounting plate to the riding mower with bolts.

The blower is placed in the cage. The cage is created with two metal tubes that encircle the blower. Two more metal tubes form the bottom of the cage and support the blower. Attached to the bottom of the two encircling metal tubes is a platform that is design to support the motor of the blower. The platform only covers a portion of the area encircle by metal tubes. Only the motor portion of the blower is supported by the platform. The vane portion of the blower is supported by the two metal tubes that form the bottom of the cage. At each end of encircling metal tubes an attaching plate is fastened. The attaching plate has a set of opening and pins for attaching to the set of opening and angled slots in the mounting plate. Since the cage is created by four tubes, a partial bottom and two attachment plates, cage is light and easy to transport and attach to the riding mower.

The cage is attached to the mounting plate on the back of the riding mower. The cage is attached to mounting plate by placing pins on the attaching plate within the angles slots on both edges of the mounting plate. Then the openings on the edges of mounting plate are aligned with openings of the attaching plate. A clovis pins are placed through openings to hold cage on the mounting plate on riding mower. The mounting plate can have more than one set of openings and angled slots and thus the cage can be moved up and down to fit the terrain and the area that the debris is to be removed.

DETAILED DESCRIPTION OF THE PREFERRED EMBODIMENT

Figure 1:
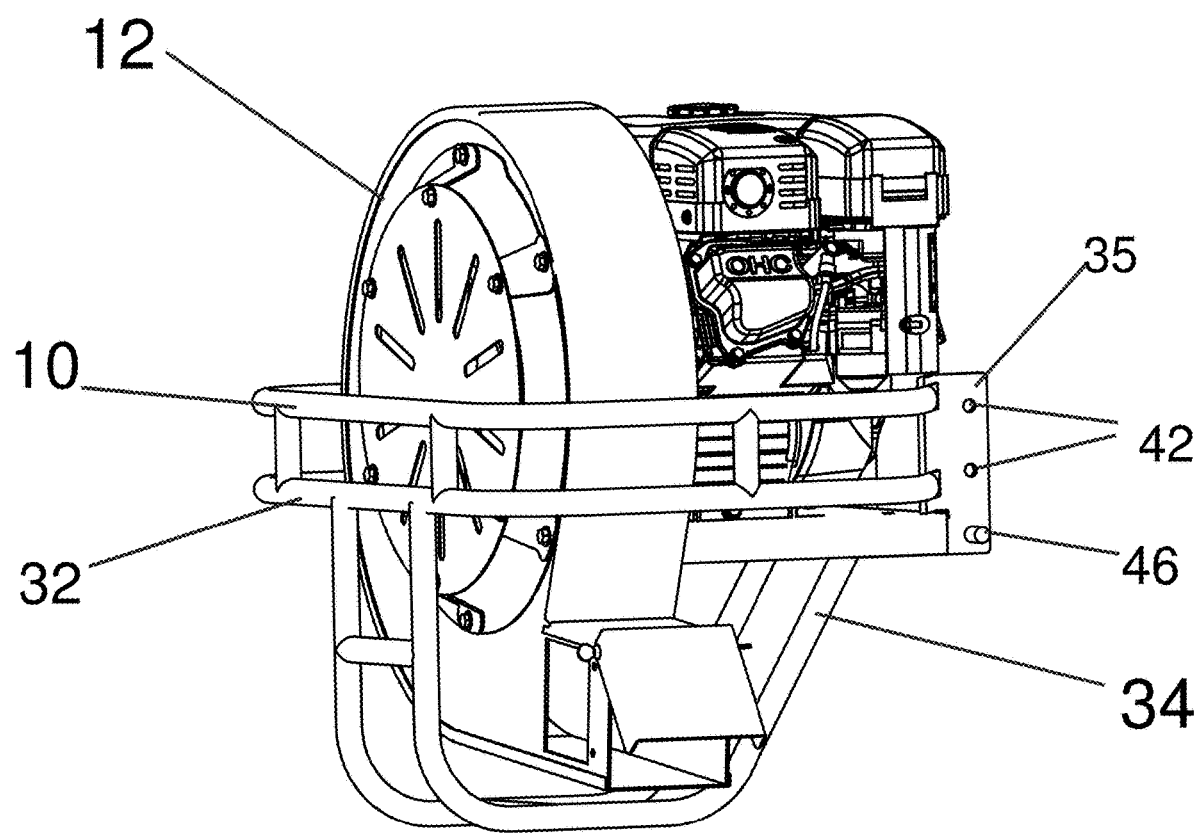
FIG. 1 is a perspective view of the cage of the invention with a blower within.
Figure 2:
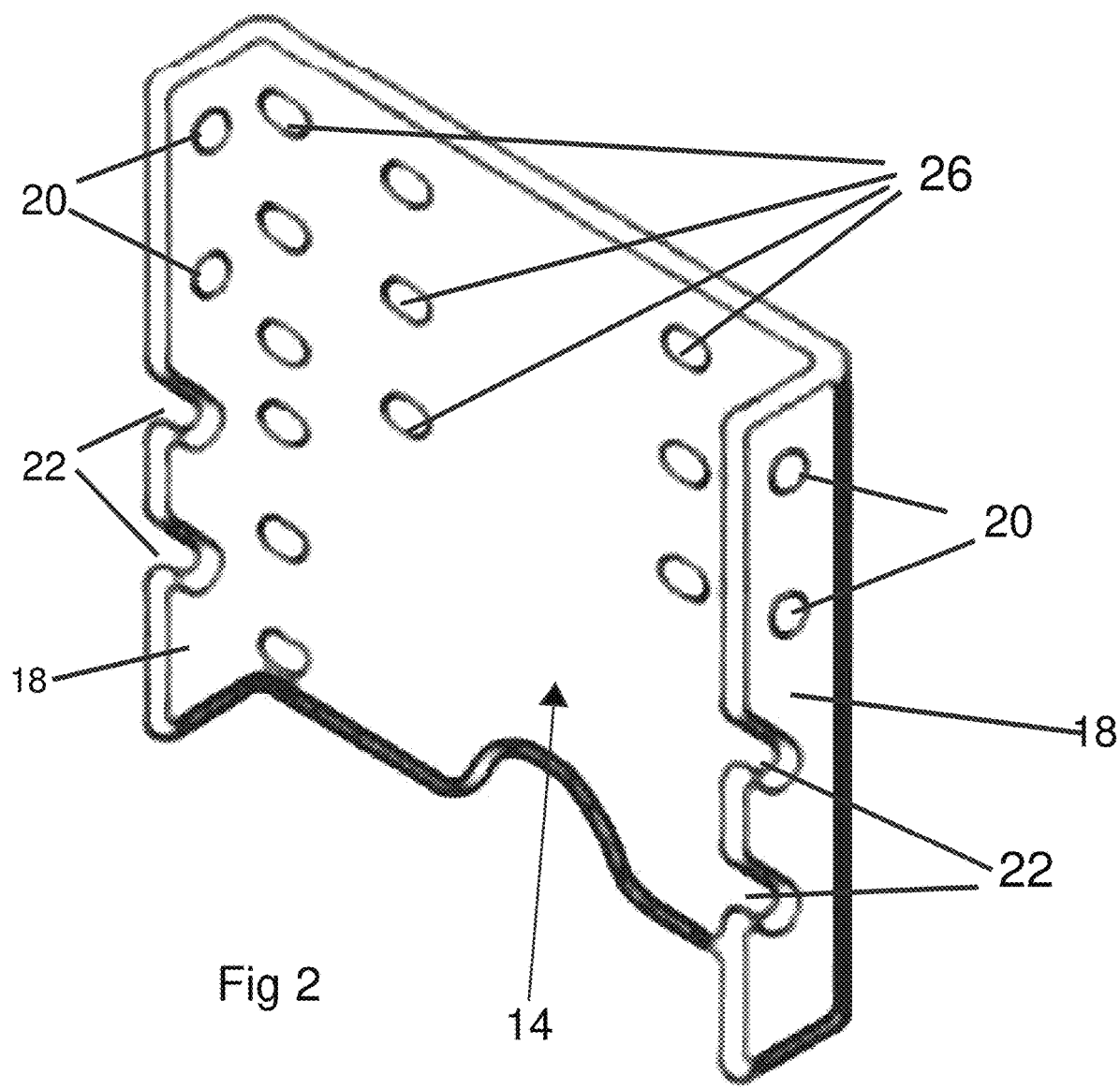
FIG. 2 is a perspective view of the mounting plate.

The invention consists of two parts. The first part is a cage 10 in which the blower 60 is placed as shown in FIG. 1. The second part is a mounting plate 14 that is mounted on the back of the riding mower 16. In the preferred embodiment, the riding mower 16 is a zero turn riding mower. The mounting plate 14 is placed on the back of the riding mower 16. The mounting plate 14 is made out of the flat piece of steel with the edges 18 turned at a right angle as shown in FIG. 2. On the top portion of the edges 18 there are openings 20. On the bottom portion of the edges 18 there are angled slots 22 that angle downward. On the flat portion 24 of the mounting plate 14 there is a set of openings 26. This set of openings 26 are used to attached the mounting plate 14 to the riding mower 16. The mounting plate 14 is attached to the riding mower 16 by nuts and bolts. On some riding mowers, there are openings in the rear of the mower for the attachment of a mounting plate 14. If these openings align with the openings 26 on the mounting plate 14 then an individual attaches the mounting plate 14 to the riding mower 16 by bolting mounting plate 14 to the back of the riding mower 16 by using the openings provided in the mounting plate 14 and the riding mower 16. If the riding mower 16 fails to have openings on it back or the openings do not correspond to the opening in the mounting plate, then an individual that is attaching the mounting plate 14 needs to drill corresponding openings to the openings 26 in the mounting plate in the back bumper of the riding mower 16. Once these openings are drill then the mounting plate 14 is bolted to riding mower 16.

Figure 3:
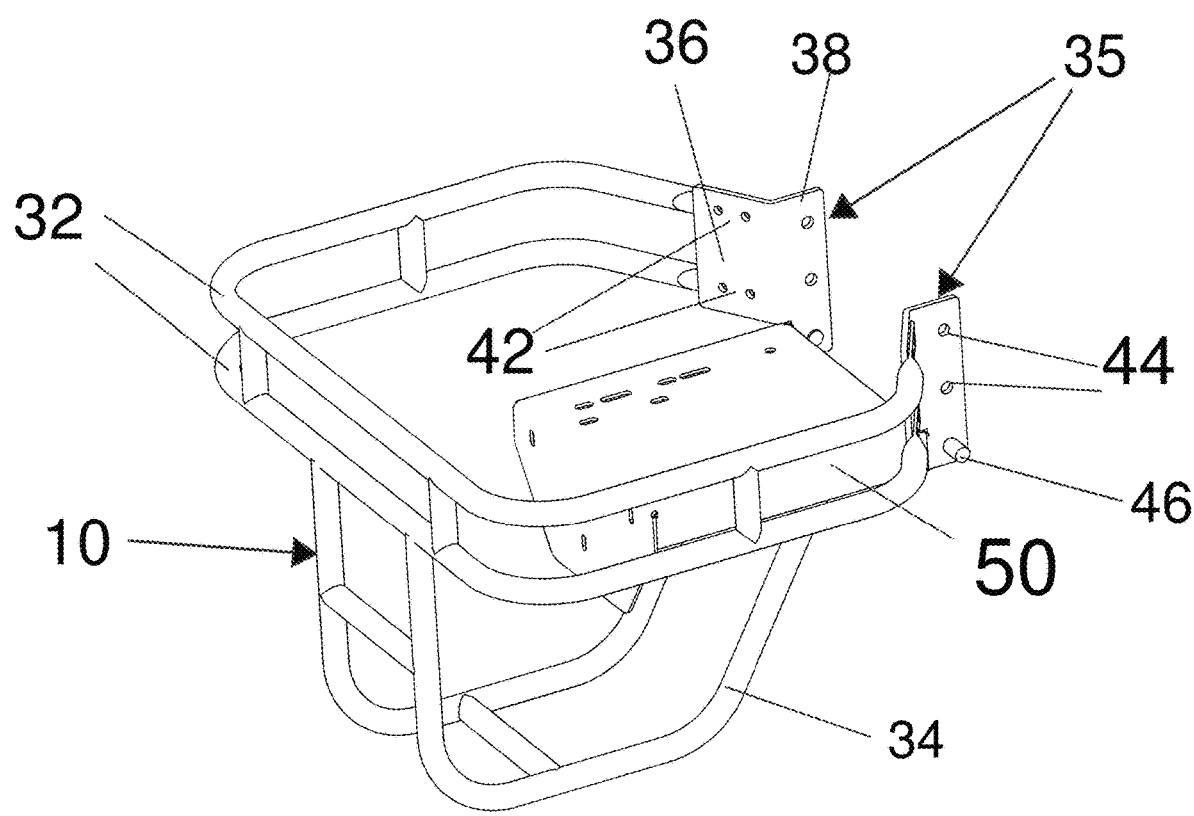
FIG. 3 is a perspective view of the cage.

FIG. 3 shows the cage 10. The cage 10 is created with two metal tubes 32 that encircle the blower 12 as shown in FIG. 1. Another two metal tubes 34 form the bottom of the cage 10 as shown in FIG. 3. In the preferred embodiment, these metal tubes 32 and 34 are attached together by welding but they can be attached by other methods known in the art such as bolts or rivets. In the preferred embodiment, these metal tubes 32 and 34 are made out of 1-inch tubular steel. At each end of metal tubes 32 is the attaching plate 35. Since the cage 10 is created by four tubes 32 and 34 of steel and two attachment plates, the cage is light and easy to transport and attach to the riding mower 12.

The attaching plate 35 is attached to the cage and attaches the cage to the mounting plate. The attaching plate 35 is designed to attach the metal tubes 32 to the mounting plate 14. Attaching plate 35 is comprised of a first attaching side 36 that is attaches to metal tubes 32 and second attaching side 38 that attaches to mounting plate 14. At the ends of metal tubes 32 are a set of openings that corresponds to a set of openings 42 on first attaching side 36 of the attaching plate 35. These two sets of opening 42 allow the metal tubes 32 and the attaching plates 35 two attached together through bolts. The two attaching sides 36 and 38 angled enabling attaching plate 35 to be attached to metal tubes 32 and mounting plate 14. On the attaching plate 35 at the top of the second attaching side 38 is an opening 44. At the bottom of attaching plate 35 of the second attaching side 38 is a pin 46. Pin 46 is a design to fit within the angle slots 22 on the edge 18 of mounting plate 14. When pin 46 fits within angle slots 22 opening 44 aligns with openings 20 on the edge 18 of mounting plate 14.

Figure 4:
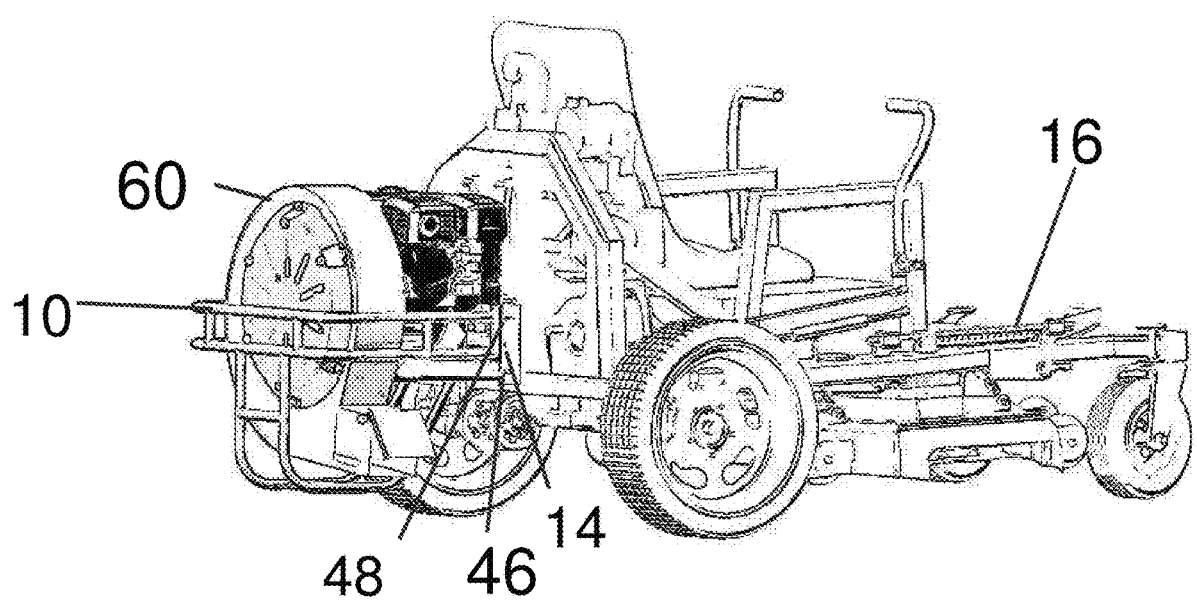
FIG. 4 is a perspective view of the invention attached to a riding mower.
Figure 5:
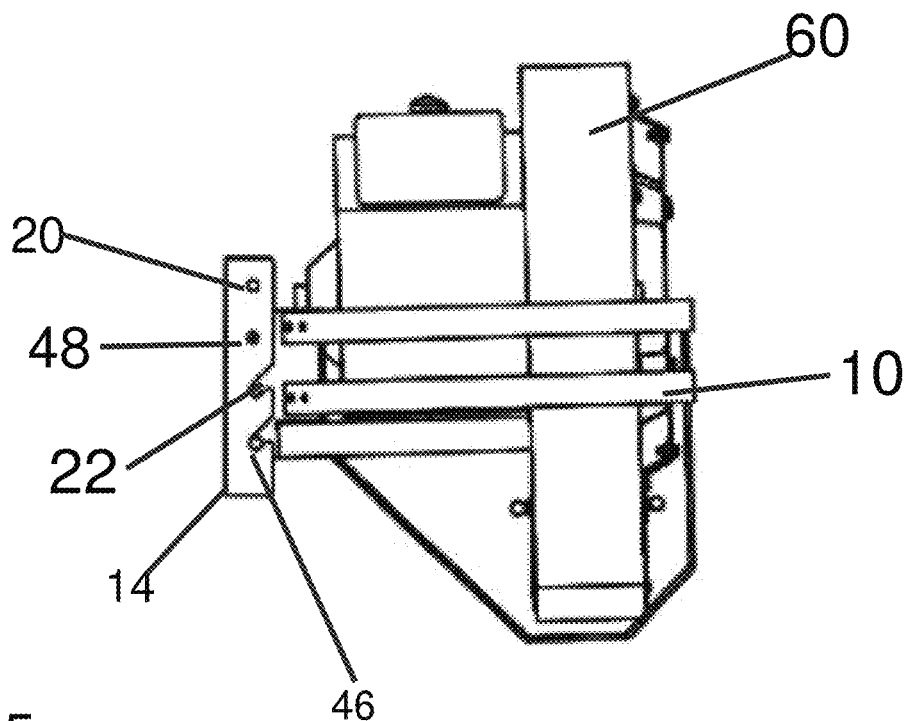
FIG. 5 is a view of the cage attached to the mounting plate.
Figure 6:
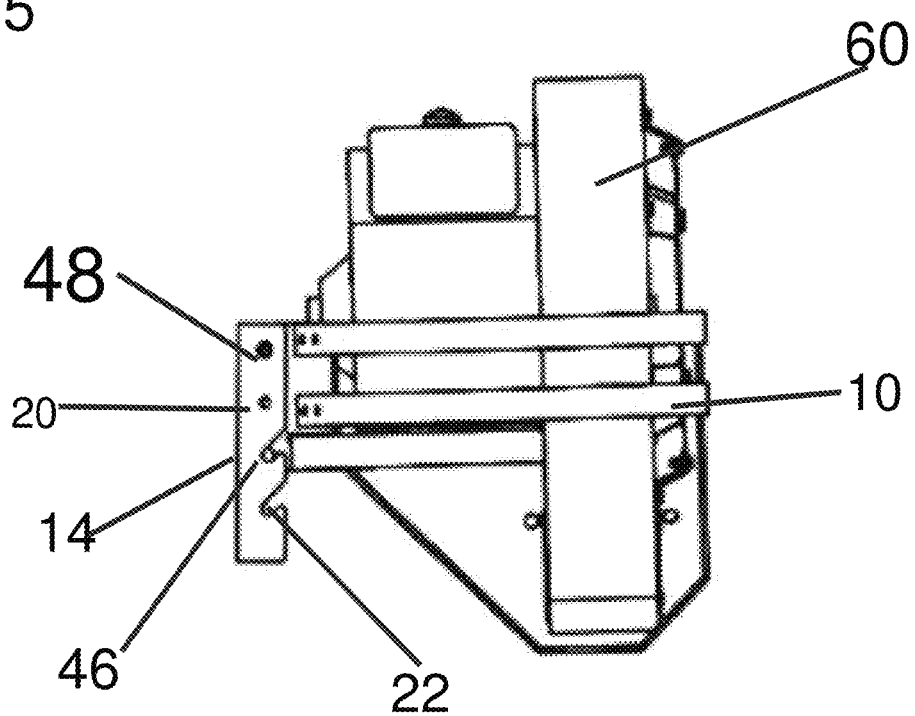
FIG. 6 is a view of the cage attached to the mounting plate with the cage in a lower position.

The cage 10 is attached to mounting plate 14 by placing pin 46 within the angles slots 22 on both edges 18 of the mounting plate 14. Then opening 20 on the edge 18 of mounting plate 14 is aligned with opening 44 of attaching plate 35. Clovis pins 48 is placed through openings 44 and 20 to hold together cage 10 and mounting plate 14 on riding mower 12 as shown in FIGS. 4, 5 and 6.

Running along bottom of metal tubes 32 is a platform 50. Platform 50 is attached to the metal tubes 32 and the attaching plate 35 and supported by ring tubes 34. Platform 50 provides a surface and support for the motor 62 of the blower 60 as shown in FIG. 3. Platform 50 only covers a portion of the area encircle by metal ring tubes 32.

Figure 7:
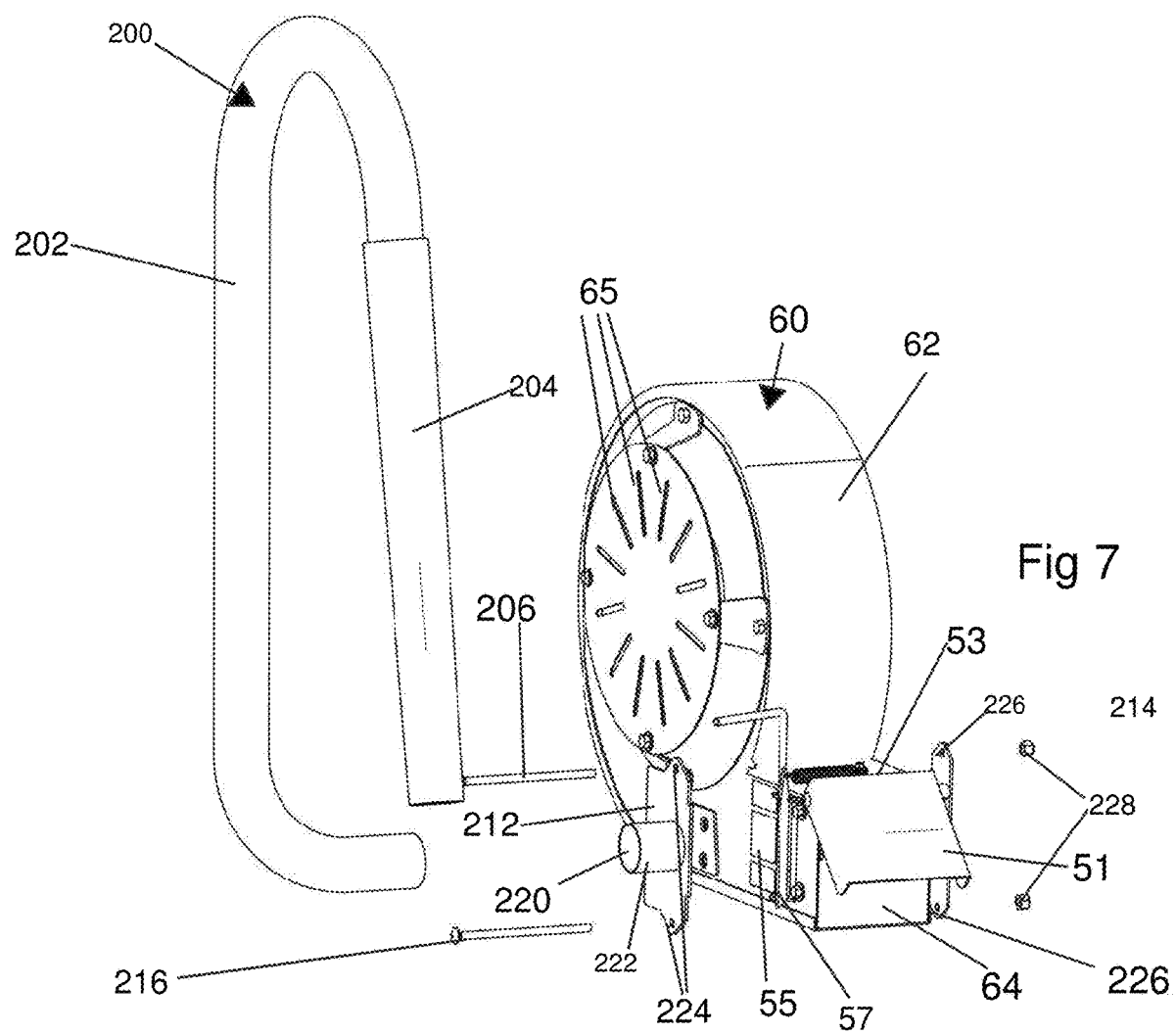
FIG. 7 is an exploded view of the blower with the wand.

Blower 60 as shown in FIG. 7 is a centrifuge blower. The blowers 60 usually contain a circular housing 62 that contains the spinning vanes. Tangentially extending from the bottom of the circular housing is a tangential duck 53 which ends with an output port 64 through which the air is blown. Output port 64 has a flap door 51 which can be located in the up position to allow the pressurized air to flow out output port 64 or in the down position which blocks the flow of air through output port 64. On the side of tangential duck 53 near output port 64 is front output port 55. Output port 55 can also be covered by a flap door 57. Flap door 57 is attached to the side of tangential duck 53 with a mechanism that allow flap door 57 to close over output port 55 to stop the airflow out of output port 55. When output port 55 is closed by flap door 57 and flap door 51 is in up position the pressurized air flows through output port 64. When flap door 57 is open the pressurized air flow out of output port 55.

The air is taken into the blower 60 by openings 65 surrounding the center of the blower 60. The spinning vanes forces the air out of the output port 64. The vanes are spun by motor 66. The blower housing 62 is a large circular housing and the motor 66 is a smaller circular housing. The blower housing 62 fits within the area encircle by metal tubes 34 but not covered by platform 50. The blower output 64 fits between metal tubes 34 and the bottom metal tubes 32. The motor 66 sits on platform 50. In this configuration, the blower 60 expels air out the side of the riding mower 12.

The cage 10 is designed to easily attach to the mounting plate 14. In order to attach cage 10 mounting plate 14 one just places the pin 46 on the bottom of attaching plate 35 into the angles slots 22 on the edges 18 of mounting plate 14 as shown in FIG. 5. Then one aligns the openings 20 on the edge 18 of mounting plate 14 with the openings 40 of attaching plate 35 and places a clovis pin 64 through both openings 20 and 44.

Mounting plate 14 has two or more sets of openings 20 and angle slots 22. Thus, the operator of the mower easily change the height of the blower 60. The individual operating the mower removes the clovis pins 64 and pulls the cage 10 from the angle slots 22. He then moves the cage 10 by placing pin 46 into another set of angle slots 22 as shown in FIG. 6. He then aligns openings 20 and 44 and places the clovis pins 64 through the openings 20 and 44 as shown in FIGS. 5 and 6.

One of the problems with mounting a blower on the back of a mower is that mower cannot be driven up a ramp to be loaded on a trailer. When the mower tilts upward as it enters the ramp, the blower on the back of the mower will touch the ground. Thus, the blower must be moved up or removed. The applicant has partially solved this problem by making it easy to remove the blower by removing the clovis pins 64 and lifting the mower off the mounting plate 14.

The applicant has also designed an embodiment to easily lift the blower to a higher position to enable the mower to be driven up a ramp onto a trailer. This embodiment has a lifting blower mounting plate 114 shown in FIG. 8 that is similar to the mounting plate 14. The lifting blower mounting plate 114 has a similar set of openings as to mounting plate 14 for attaching the lifting blower mounting plate 114 to a riding mower 16. The lifting blower mounting plate 114 is placed on the back of the riding mower 16. The lifting blower mounting plate 114 is made out of the flat piece of steel.

Figure 8:
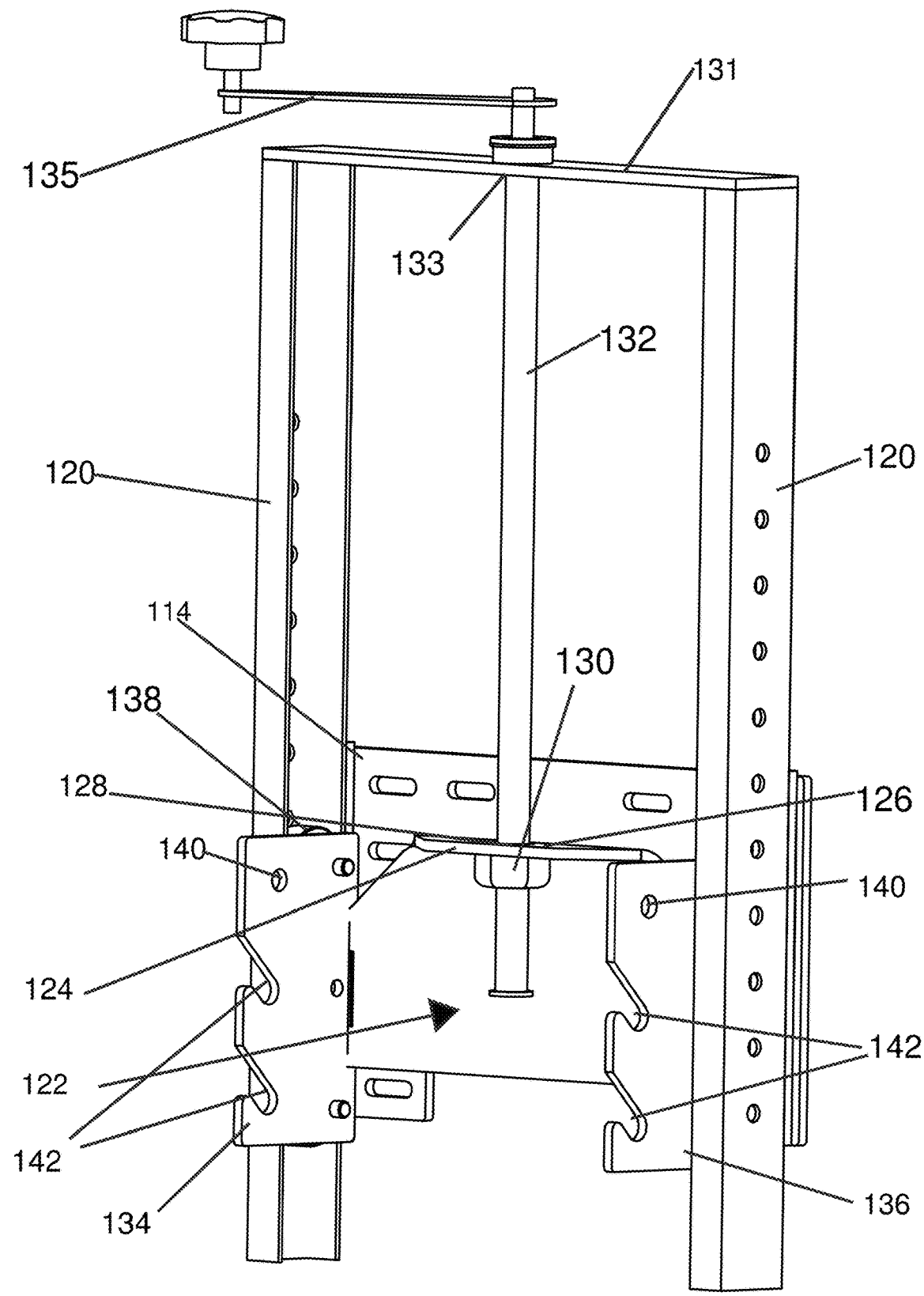
FIG. 8 is a perspective view of the lifting blower mounting plate.

Attached to each edge of the Lifting blower mounting plate 114 are guide rails 120. The guide rails 120 extend above the lifting blower mounting plate 114. The guide rails 120 are U-shaped with one side of the U attached lifting blower mounting plate 114. Above the lifting blower mounting plate 114 is a movable carriage 122 that supports the cage 10. For this embodiment cage 10 is exactly like cage 10 of the previous embodiment. The movable carriage 122 is comprised of a top plate 124. The top of plate 124 is bent at a right angle forming top 126. On top 126, an opening 128 is placed. Opening 128 can contain threads. In the preferred embodiment as shown in FIG. 8 underneath opening 128 a threaded nut 130 is welded. Through opening 128 and threaded nut 130 a threaded shaft 132 is placed.

A bar 131 is attached to the top of the guide rails 120. The bar 131 has an opening 133 through which the threaded shaft 132 is placed. The threaded shaft 132 is able to rotate within the opening 133. A crank 135 is attached to the threaded shaft 132 above the bar 131.

To the edges 134 and 136 of movable carriage 122 a set of wheels 138(only one shown) are attached. These sets of wheels 138 fit within the U-shaped guide rails 120. When the threaded shaft 132 is turned the movable carriage 122 can be moved up or down. When the threaded shaft 132 is turned in one direction the movable carriage 122 will move downward. The movable carriage 122 is held in place by the set of wheels 138 resting in the U-shaped guide rails 120. When the threaded shaft 132 is turned in the opposite direction the movable carriage 122 will move upward.

The edges 134 and 136 of the movable carriage 122 turn outward at a right angle to the movable carriage 122 and in the direction away from the lifting blower mounting plate 114. On the top portion of the edges 134 and 136 are openings 140. On the bottom portion of the edges 134 and 136 there are angled slots 142 that angle downward as shown in FIG. 8.

The cage 10 is designed to easily attach to the movable carriage 122. In order to attach cage 10 movable carriage 122 one just places the pin 46 on the bottom of attaching plate 35 into the angles slots 142 on the edges 134 and 136 of the movable carriage 122. Then one aligns the openings 140 on the edges 134 and 136 of the movable carriage 122 with the openings 40 of attaching plate 35 and places a clovis pin 64 through both openings 140 and 40.

The threaded shaft 132 could also be driven by a motor. The motor would turn the threaded shaft 132 to move the movable carriage 122 with the cage 10 containing the blower 32 up and down. The threaded shaft 132 could also be replaced with a linear actuator which would lift the movable carriage 122 up and down upon command.

The blower 60 has a wand 200 attach as shown in FIG. 7. Wand 200 attaches to blower 60 through output port 55. Wand 200 is comprised of a hose 204 and a nozzle 202. Attached to nozzle 202 is handle 206. The air pressurized by blower 60 passes through output port 55 and into wand 200, traveling through hose 204 and out nozzle 202. The wand 200 can be used to direct the pressurized air for blower 60 is any direction.

The wand 200 is attach to output port 55 by a wand adaptor assembly. Wand adaptor assembly is comprised of a front wand adaptor plate 212, a back wand adaptor plate 214, and long assembly bolts 216. The front wand adaptor plate 212 is taller than the tangential duck 53. The front wand adaptor plate 212 has openings 224 at its top and bottom adapted to fit the long assembly bolts 216. The front wand adaptor plate 212 has a large circular opening 220 in its front with a flange 222 protruding from the opening's 220 circumference. The flange's 222 outer circumference is slightly less than hose's 204 inner circumference such that the hose 204 can be place over the flange 222 and be held securely in place by a friction fit.

The wand adaptor assembly is place on the blower 60 by placing the front wand adaptor plate 212 over the output port 55 to allowed the pressurized air to flow through the flange 222. When the front wand adaptor plate 212 is placed over the output port 55 the openings 224 are above and below the tangential duck 53. The back wand adaptor plate 214 is rectangular in shape and has openings 226 at its top and bottom. The back wand adaptor plate 214 is place on the back of the tangential duck 53 directly opposite the front wand adaptor plate 212. The opening 224 in the front wand adaptor plate 212 are aligned with the openings 226 in the back-wand adaptor plate 214. The long assembly bolts 216 are place through the openings 224 and 226 and nuts 228 are thread the long assembly bolts 216 to hold the front wand adaptor place 212 and the back wand adaptor plate 214 in place as shown in FIG. 7.

I claim:

1. A blower and a blower mounting system that mounts the blower with a motor on a riding mower, the blower mounting system comprising:
   a) a cage designed to hold the blower; and,
   b) a mounting plate with edges, and a back that enables the cage to be attached to the mounting plate and be detachable from the mounting plate; and,
   c) a means for attaching the mounting plate to the riding mower; and,
   d) a means that allows the cage to attach to the mounting plate and be detachable from the mounting plate;
      e) the blower comprising;
      a) a blower with an output that sits within the cage.

2. The blower and the blower mounting system that mounts the blower with a motor on a riding mower as in claim 1 wherein:
   a) the mounting plate is a flat piece of material with its edges turned at right angles and each edge has a first opening and a first slot.

3. The blower and the blower mounting system that mounts the blower with a motor on a riding mower as in claim 2 wherein:
   a) the mounting plate on each edge has a second opening and a second slot.

4. The blower and the blower mounting system that mounts a the blower with a motor on a riding mower as in claim 3 wherein:
   a) the means that allows the cage to attach to the mounting plate and be detachable from the mounting plate comprises:
      1) a set of attaching plates attached to the cage that contains an opening and a pin: and,
      2) a set of cotter pins; and,
         3) wherein after the mounting plate is mounted to the riding mower, the pins on attaching plates are placed in the slots of the mounting plate and the openings in the attaching plates are aligned with the openings in the mounting plate and cotter pins are placed through the openings in the attaching plates and in the mounting plate.

5. The blower and the blower mounting system that mounts the blower with a motor on a riding mower as in claim 4 wherein:
   a) the means for attaching the mounting plate to the riding mower comprises; and,
   1) openings in the back of the mounting plate; and,
   2) bolts that are adapted to fit the openings in the back of the mounting plate.

6. The blower and the blower mounting system that mounts the blower with a motor on a riding mower as claim 5 wherein:
   1) the cage comprises:
   a) two horizontal tubes that will encircle the blower and form an upper and lower tube and are attached to the means for attaching the cage to the mounting plate; and,
   b) two ringing tubes attached to the lower horizontal tube and said ringing tubes support the blower; and,
   c) a platform for supporting the motor of the blower supported by the ringing tubes and attached to the lower horizontal tube; and,
   d) a first set of reinforcement tubes that attach to the two horizontal tubes; and,
   e) a second set of reinforcement tube that attaches to the two ringing tubes.

7. The blower and the blower mounting system that mounts the blower with a motor on a riding mower as in claim 2 wherein:

a) the means that allows the cage to attach to the mounting plate and be detachable from the mounting plate comprises:
   1) a set of attaching plates attached to the cage that contains an opening and a pin: and,
   2. a set of cotter pins; and,
   3) wherein after the mounting plate is mounted to the riding mower, the pins on the attaching plates are placed in the slots on the mounting plate and the openings in the attaching plates are aligned with the openings in the mounting plate and cotter pins are placed through the openings in the attaching plates and in the mounting plate.

8. The blower and the blower mounting system that mounts the blower with a motor on a riding mower as in claim 1 further comprising:
   a) a hose assembly for directing the air outputted by the blower: and,
   b) a means for attaching the hose assembly to the blower's output port.

9. The blower and the blower mounting system that mounts the blower with a motor on a riding mower as in claim 8 further comprising:
   a) the blower has a tangential duck that contains an output ports on its side; and,
   b) the means for attaching the hose to the blower output port comprises:
      1) a front adaptor plate with and top and bottom and with a large circular opening in its center with a flange protruding from the opening's circumference and said flange outer circumference is slightly less than hose's inner circumference such that the hose can be placed over the flange and be held securely in place by a friction fit: and,
      2) the front adaptor plate has openings at its top and bottom; and,
      3) a back-adaptor plate with a top and bottom that has openings at its top and bottom; and,
      4) the front adaptor plate and the back adaptor plate are taller than the tangential duck; and,
      5) long bolts with nuts adapted to fit through the opening at the top and bottom of the front and back adaptor plates; and,
      6) wherein the front adaptor plate is placed over the output port of the blower and the back adaptor plate is placed on the back of the tangential duck directly opposite the front adaptor plate and the opening at the top and bottom of the front adaptor plate are aligned with the openings at the top and bottom of the back adaptor plate and the long bolts are place through the opening at the top and bottom of the front and back adaptor plate and the nuts are thread over the long bolts to hold the front and back adaptor plates in place and the hose is placed over the flange.

10. The blower and the blower mounting system that mounts the blower with a motor on a riding mower as in claim 6 wherein:
    a) the means for attaching the mounting plate to the riding mower comprises;
    1) openings in the back of the mounting plate; and,
    2) bolts that are adapted to fit the openings in the back of the mounting plate.

11. The blower and the blower mounting system that mounts the blower with a motor on a riding mower as in claim 10 wherein:
    1) the cage comprises:
    a) two horizontal tubes that will encircle the blower and form an upper and lower tube and are attached to the means for attaching the cage to the mounting plate; and,
    b) two ringing tubes attached to the lower horizontal tube and said ringing tubes support the blower; and,
    c) a platform for supporting the motor of the blower supported by the ringing tubes and attached to the lower horizontal tube; and,
    d) a first set of reinforcement tubes that attach to the two horizontal tubes; and,
    e) a second set of reinforcement tube that attaches to the two ringing tubes.

12. The blower and the blower mounting system that mounts the blower with a motor on a riding mower as in claim 11 further comprising:
    a) the blower is a centrifuge blower; and,
    b) the blower has two output ports through which air can flow; and,
    c) each output port has a door which can shut off the flow of air through the output port; and,
    d) a hose assembly for directing the air outputted by the blower: and,
    e) a means for attaching the hose to the blower's output port.

13. The blower and the blower mounting system that mounts the blower with a motor on a riding mower as in claim 1 wherein:
    a) the means for attaching the mounting plate to the riding mower comprises;
    1) openings in the back of the mounting plate; and,
    2) bolts that are adapted to fit the openings in the back of the mounting plate.

14. The blower and the blower mounting system that mounts the blower with a motor on a riding mower as claim 1 wherein:
    1) the cage comprises:
    a) two horizontal tubes that will encircle the blower and form an upper and lower tube and are attached to the means for attaching the cage to the mounting plate; and,
    b) two ringing tubes attached to the lower horizontal tube and said ringing tubes support the blower; and,
    c) a platform for supporting the motor of the blower supported by the ringing tubes and attached to the lower horizontal tube; and,
    d) a first set of reinforcement tubes that attach to the two horizontal tubes; and,
    e) a second set of reinforcement tube that attaches to the two ringing tubes.

15. The blower and the blower mounting system that mounts the blower with a motor on a riding mower as claim 1 wherein:
    a) the means that allows the cage to attach to the mounting plate and be detachable from the mounting plate comprises:
    1) guide rails attached to each edge of the mounting plate; and,
    2) a moveable carriage that can move up and down the guide rails; and,
    3) a means to attach the moveable carriage to the cage that allows the cage to attach to the movable carriage and be detachable from the movable carriage.

16. The blower and the blower mounting system that mounts the blower with a motor on a riding mower as claim 15 wherein:
    a) the guide rails have a top and extend above the mounting plate and are U- shaped with one side of the U attached to the mounting plate; and, b) the movable carriage is a movable plate with a flat back and with edges that are bent a right angle and each of said edges has an opening and a slot and said movable carriage has a top that is bent at a right angle; and,
c) the movable carriage has a means for moving the movable carriage along the guide rails comprising:
  1) a set of wheels attached to the edges of the movable carriage and the wheels fits within the U shape of the guide rails; and,
  2) the top of the movable carriage has a threaded opening; and,
  3) a bar that attaches to the top of the guide rails; and,
  4) an opening in the bar; and,
  5) a threaded shaft that passes through the opening in the bar and is able to rotate within the opening; and,
  6) the threaded shaft is threaded into the threaded opening in the top of the movable carriage; and,
  7) a crank that can be turned in either direction attached to the threaded shaft above the bar; and,
d) wherein when the crank is turned in one direction the movable carriage will move downward and when the crank turned in the opposite direction the movable carriage will move upward.

17. The blower and the blower mounting system that mounts the blower with a motor on a riding mower as in claim 16 wherein:
a) the means that allows the cage to attach to the movable carriage and be detachable from the movable carriage comprises:
  1) a set of attaching plates attached to the cage that contains a first opening and a first pin: and,
  2) a set of cotter pins; and,
  3) wherein after the mounting plate is mounted to the riding mower, the pins on the attaching plates are placed in the slots on the mounting plate and the openings in the attaching plates are aligned with the openings in the mounting plate and cotter pins are placed through the openings in the attaching plates and in the mounting plate.

18. The blower and the blower mounting system that mounts the blower with a motor on a riding mower as claim 17 wherein:
a) the means for attaching the mounting plate to the riding mower comprises;
  1) openings in the back of the mounting plate; and,
  2) bolts that are adapted to fit the openings in the back of the mounting plate.

19. The blower and the blower mounting system that mounts a the blower with a motor on a riding mower as in claim 1 further wherein:
a) the blower is a centrifuge blower; and,
b) the blower has two output ports through which air can flow; and,
c) each output port has a door which can shut off the flow of air through the output port.

\* \* \* \* \*